(12) United States Patent
Beadnell et al.

(10) Patent No.: US 9,009,440 B2
(45) Date of Patent: Apr. 14, 2015

(54) ADJUSTMENT OF DATA STORAGE CAPACITY PROVIDED BY A STORAGE SYSTEM

(75) Inventors: Duncan Beadnell, Abingdon (GB); Don Harwood, Abingdon (GB)

(73) Assignee: LSI Corporation, Milpitas, CA (US)

( * ) Notice: Subject to any disclaimer, the term of this patent is extended or adjusted under 35 U.S.C. 154(b) by 2031 days.

(21) Appl. No.: 11/938,525

(22) Filed: Nov. 12, 2007

(65) Prior Publication Data

US 2009/0125699 A1 May 14, 2009

(51) Int. Cl.
*G06F 3/06* (2006.01)
*G06F 12/02* (2006.01)
*G06F 12/06* (2006.01)

(52) U.S. Cl.
CPC ............ *G06F 3/0644* (2013.01); *G06F 3/0607* (2013.01); *G06F 3/0676* (2013.01)

(58) Field of Classification Search
None
See application file for complete search history.

(56) References Cited

U.S. PATENT DOCUMENTS

| | | | | |
|---|---|---|---|---|
| 5,129,088 A | * | 7/1992 | Auslander et al. | 711/1 |
| 5,435,004 A | * | 7/1995 | Cox et al. | 711/112 |
| 5,897,661 A | * | 4/1999 | Baranovsky et al. | 711/170 |
| 6,397,308 B1 | * | 5/2002 | Ofek et al. | 711/162 |
| 6,718,436 B2 | * | 4/2004 | Kim et al. | 711/114 |
| 6,795,895 B2 | * | 9/2004 | Merkey et al. | 711/114 |
| 7,076,632 B2 | * | 7/2006 | McBrearty et al. | 711/202 |
| 7,325,097 B1 | * | 1/2008 | Darcy | 711/117 |
| 7,398,524 B2 | * | 7/2008 | Shapiro | 717/175 |

OTHER PUBLICATIONS

ANTFS Bad Sectors Resolution: The $BadClus metafile (updated Apr. 16, 2007), webpage retrieved from http://www.djkaty.com/drupal/ntfsbadsectors on Jan. 30, 2008.
ANTFS Bad Sectors Resolution: The $BadClus metafile (updated Apr. 16, 2007), webpage retrieved from http://www.web.archive.org/web/20070427050955/http://www.djkaty.com/drupal/ntfsbadsectors on Feb. 3, 2008.
Drobo User Guide, 2007.
Data Robotics Introduces the World's First Storage Robot, Jun. 5, 2007, Press Release, webpage retrieved from www.drobo.com/press_release_2007_06-05.aspx.

(Continued)

*Primary Examiner* — Daniel Bernard
(74) *Attorney, Agent, or Firm* — Duft Bornsen & Fettig LLP

(57) ABSTRACT

A storage system stores data in at least one partition of a physical storage media in accordance with file system information specifying a plurality of logical blocks having logical block addresses within the partition. The logical blocks include excess logical blocks that are not mapped to space in the physical storage media by the mapping employed by the storage system. Unusable block data marks those excess logical blocks as unusable. This makes it easy to adjust the data storage capacity of the storage system by changing the mapping to map more or less logical block addresses to space in the physical storage media and thereby destroy or create excess logical blocks, and by changing the unusable block data to correspondingly change the excess logical blocks marked as unusable.

30 Claims, 3 Drawing Sheets

(56) References Cited

OTHER PUBLICATIONS

Data Robotics Introduces the World's First Storage Robot, Jun. 5, 2007, Press Release, webpage retrieved from www.web.archive.org/20070607164459/http://www.drobo.com/press_release_2007_06-05.aspx (best available copy).

Norton PartitionMagic 8 CNET Editors' Review (Reviewed on May 3, 2007; Release Date: Aug. 16, 2004) webpage retrieved from http://reviews.cnet.com/disk-management-and-compression/norton-partitionmagic-8/4514-3684_7-30911285.html.

* cited by examiner

ADJUSTMENT OF DATA STORAGE CAPACITY PROVIDED BY A STORAGE SYSTEM

BACKGROUND OF THE INVENTION (1) Field of the Invention

The present invention relates generally to computer systems and in particular to a storage system which provides data storage to a host system.

(2) Description of Related Art

Such a storage system has physical storage media for the storage of data, for example one or more storage devices such as a hard disk drive. Typically, data is stored in the physical storage media in one or more partitions. For example, the partitions may be specified in a partition table contained in the master boot record stored at the start of the storage space.

Each partition uses a file system to organise the storage of data. In particular, the file system specifies how the partition is divided into logical blocks and how data files are allocated to different blocks. Typically the file system may specify clusters as being constituted by a plurality of blocks and may use a file allocation table to specify how files are allocated to sectors, and therefore to blocks. The file system is specified in file system information stored in the physical storage media. Typically, the file system information is stored at the start of the logical storage space of each partition and includes various information such as parameters of the file system including the size of the clusters. The file system information may also include a file allocation table which specifies how files are allocated to individual clusters. The host system reads the file system information, manages the storage of data in accordance therewith and updates the file allocation table.

The logical blocks within the partition are specified using logical block addresses. Thus, the host system sends access requests to the storage system which specify logical block addresses for data access (e.g. reading or writing). The storage system then performs the data access in accordance with an access request. The physical storage of data on the physical storage media is controlled by the storage system and is transparent to the host system.

The present invention is concerned in particular with adjustment of the data storage capacity provided to the host system by a partition of the storage system.

Usually the data storage capacity of a partition of the physical storage media is fixed. However, there are many scenarios in which it is desirable to adjust the data capacity of the storage system. This creates inconvenience to the user as follows.

One scenario is when additional physical storage media is introduced into the storage system, for example by inserting an additional data storage device. In this scenario, the user typically has two options.

A first option is to create a new partition occupying the new space of the additional physical storage media. A file system can then be created in the new partition. However, thereafter the user and/or host system must organise the storage of data into the two separate partitions. For example, the two partitions may appear to the user as two different drives (e.g. C:\ and D:\). This is inconvenient and it would be preferable for the new storage space of the additional physical storage media to be allocated to an existing partition.

Accordingly, a second option is for the user to cause the host system to perform a process, which may comprise part of the operating system of the host system or may be a third party tool, which can expand the existing partition and file system to fill the new space. However, such processes are complicated and usually require the user to have specialist knowledge. Thus, in this scenario it would be desirable to adjust the data storage capacity of an existing partition in a manner which is more convenient to the user than using such a process.

Another scenario in which it would be desirable to adjust the data storage capacity of a partition is where the user desires to utilise a plurality of different partitions. This is desirable in many situations, for example to present each partition as a different drive to the user (for example C:\, D:\, etc). In this case the user typically needs to define the data storage capacity of each partition in advance. Thereafter, the partitions are fixed. This can be inconvenient to the user who may desire to change the data capacity of the different partitions at a future time depending on the relative usage of the different partitions.

As in the first scenario it might be conceivable for the user to cause the host system to perform a process, which may be a part of the operating system or may be a third party tool, to contract one partition and expand another partition using the capacity thus freed. However, such a process will be inconvenient and will typically require a user to have specialist knowledge. Thus, in this scenario also, it would be desirable to provide adjustment of the data storage capacity of the partitions in a manner which is convenient to the user.

BRIEF SUMMARY OF THE INVENTION

According to the present invention, there is provided a method of providing adjustable data storage capacity to a host system from a storage system having physical storage media for storage of data, wherein the storage system is arranged to store data in at least one partition of the physical storage media in accordance with file system information stored in the physical storage media specifying a plurality of logical blocks having logical block addresses within the partition, the file system information including unusable block data marking logical blocks as unusable, and the storage system is arranged, in response to access requests specifying logical block addresses in the at least one partition, to access the physical storage media employing a mapping which maps logical block addresses to space in the physical storage media, the method comprising storing file system information specifying a plurality of logical blocks including excess logical blocks that are not mapped to space in the physical storage media by the mapping employed by the storage system, and including unusable block data marking said excess logical blocks as unusable, the data storage capacity being adjustable by changing the mapping employed by the storage system to map more or fewer logical block addresses to space in the physical storage media and thereby destroy or create excess logical blocks, and changing the unusable block data to correspondingly change the excess logical blocks marked as unusable.

According to a further aspect of the invention, there is provided a storage system capable of providing adjustable data storage capacity to a host system in a similar manner.

The present invention provides for convenient adjustment of the data storage capacity of a partition of the storage system by making use of unusable block data which specifies logical blocks as unusable. The ability to include unusable block data specifies blocks of data as unusable is typically present in a file system but for a different purpose, that is to mark blocks of logical storage space as unusable (or "bad") when it is not possible to access the corresponding physical block of the physical storage media due to a technical fault. Typically, the storage system will have capability of reporting to the host system when such a technical fault occurs, for example when an attempted data access request fails. In response, the host system can then set the unusable block data to specify the logical block as being unusable. Typically, an entire cluster constituting a plurality of blocks is marked. Thereafter, the host system will not seek to store data at the logical blocks thus marked as unusable. However, the present invention uses unusable block data in a new manner, as follows.

The present invention involves the storage of file system information specifying a plurality of logical blocks including excess logical blocks which are not allocated to space in the physical storage media. Thus the mapping employed by the storage system does not map the excess logical blocks to space in the physical storage media.

Although the excess logical blocks are not allocated with actual data storage space, they appear to the host system as being proper logical blocks of the partition. To prevent the host system from attempting to store data in the excess logical blocks, use is made of the unusable block data to specify the excess logical blocks as being unusable. Thus, it appears to the host system that the excess logical blocks cannot be used due to a technical fault, whereas in fact this is not the case. The host system only attempts to store data in the remaining logical blocks which are not marked by the unusable block data as being unusable. Thus, the data storage capacity of the storage system appears to the host system to be the same as if the present invention was not used.

The present invention provides the advantage that it is very convenient to adjust the data storage capacity of any partition of the physical storage media. Such adjustment may be achieved simply by changing the mapping employed by the storage system to map more or fewer logical block addresses to space in the physical storage media. This causes excess logical blocks to be created or destroyed within the logical space. At the same time the unusable block data is changed to correspondingly change the excess logical blocks which are marked as unusable. Such adjustment may be performed automatically and so is very convenient to the user. The change in the mapping simply involves change in the operation of the storage system. The change in the unusable block data simply involves modifying the relevant part of the file system information stored in the physical storage media.

In general, the changes may be implemented by processes instigated under the control of either the storage system or the host system. However, particular advantage is achieved by the changes being instigated under the control of the storage system. In this case, the present invention may be implemented by appropriate design of the storage system, optionally also using a process performed by the host system.

There are numerous scenarios in which the adjustment of the data storage capacity of the storage system is advantageous.

The first scenario is where it is desired to introduce additional physical storage media into the storage system, as discussed above. In this case, the file system information initially specifies a plurality of logical blocks having a storage capacity greater than the storage capacity of the pre-existing physical storage media, possibly by a significant extent. For example, the file system information may specify that the storage device has the maximum possible size permitted by the file system (typically 2 TB at present but this is not limitative). This is larger than the actual storage capacity of the data storage media, which might be 250 GB in one example. This amount of logical blocks are mapped to space in the physical storage media so that the entire data storage capacity is available. The remaining logical blocks (being 1750 GB in this example) are excess logical blocks not mapped to space in a physical storage media. The unusable block data marks these excess logical blocks as unusable.

On introduction of additional physical storage media, the mapping employed by the storage system is changed to map the logical block addresses of a group of logical blocks which were previously excess logical blocks to the new space in the additional physical storage media. Such blocks cease to be excess logical blocks and so the unusable block data is changed to cease to mark that group of logical blocks as unusable. In the example just given, if the additional physical storage media has a data capacity of 200 GB, there will remain only 1550 GB of excess logical blocks.

A second scenario where the present invention is advantageous is where the user wishes to store data in plural partitions, as discussed above. In this case, each of the partitions may be allocated with a share of the data capacity of the physical storage media. The file system information of each partition initially specifies logical blocks mapped to its share of the space, as well as excess logical blocks that are not mapped to any space in the physical storage media.

In this scenario, the data capacity available to each partition may be changed dynamically, for example on the basis of the amount of data stored in the various partitions, for example to provide additional data capacity to a partition which is full. One option is for the logical blocks of all the partitions, excluding the excess logical blocks, to have a data storage capacity less than the data storage capacity of the physical storage media, so there is some spare space in the physical storage media. In this case, additional data capacity may be allocated to a partition by changing the mapping employed by the storage system to map logical block addresses of a group of logical blocks which were previously excess logical blocks to the spare space. Another option is to change the allocation of space between the partitions, by changing the mapping to cease to map a logical block address of a group of logical blocks of a first partition to create free space and mapping logical block addresses of a group of logical blocks of a second partition to that free space.

To allow better understanding, an embodiment of the present invention will now be described by way of non-limitative example with reference to the accompanying drawings.

DETAILED DESCRIPTION OF THE INVENTION

Figure 1:
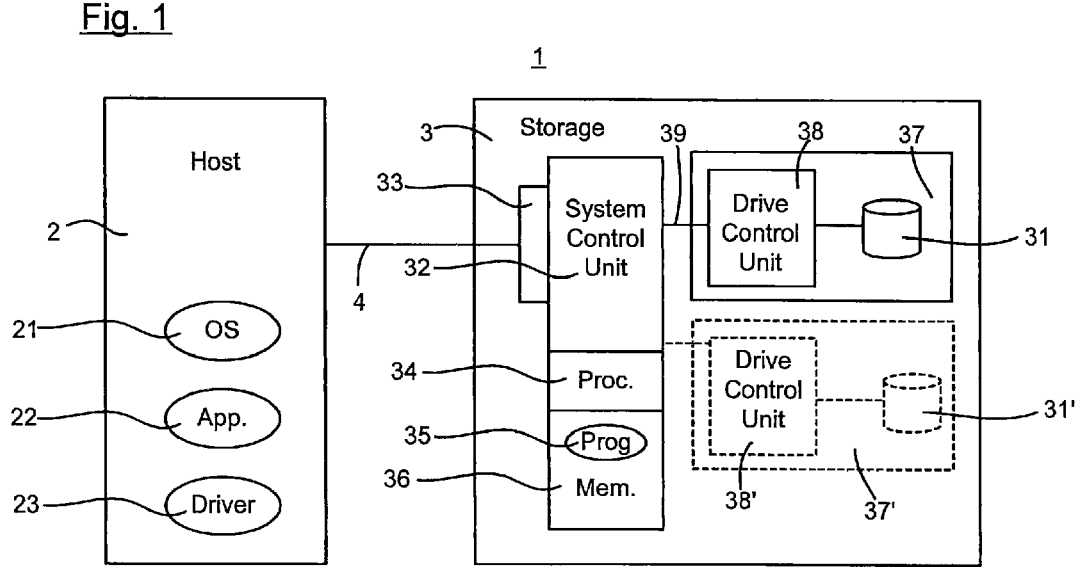
FIG. 1 is a diagram of computer apparatus comprising a storage system connected to a host system.

A computer system 1 in which the present invention is implemented is shown in FIG. 1. The computer system 1 comprises a host system 2 and a storage system 3 connected together by a databus 4. The host system 2 may be a conventional personal computer. The host system 2 runs an operating system 21 under which the host system 2 may operate any number of applications 22. The operating system 21 has installed therein a driver 23 for the storage system 3.

In this implementation, the storage system 3 is a separate apparatus from the host system 2. For example, the storage system 3 may act as Direct Attached Storage (DAS) directly attached to the host system 2 in which case the databus 4 takes a suitable form such as USB, IEEE 1394, SATA or Fibre Channel. Alternatively, the storage system 3 may act as Network Applied Storage (NAS) in which case the databus 4 is a databus of a suitable network, for example an Ethernet or other local area network.

The storage system 3 has at least one drive unit 37 comprising a physical storage media 31 for storing data. In the or each drive unit 37, the physical storage media 31 can take any form and may comprise one or more physical storage devices such as a hard disk drives. The or each drive unit 37 also has a drive control unit 38 which controls the storage of data onto the physical storage media 31.

In addition, the storage system 3 comprises a system control unit 32 which controls the storage of data onto the physical storage media 31 of the or each drive unit 37 over an interface 39 which may be for example a SATA interface. The system control unit 32 may for example be implemented in an integrated circuit chip separately from the or each drive unit 37.

The system control unit 32 has an interface 33 which interfaces the system control unit 32 with the databus 4 to allow communication with the host system 2. The system control unit 32 includes a controller 34 which controls the operation of the system control unit 32 and may be implemented by a processor running an appropriate program 35 stored in a memory 36. The system control unit 32 also includes appropriate hardware for transferring data between the interface 33 and the or each drive unit 37.

Figure 2:
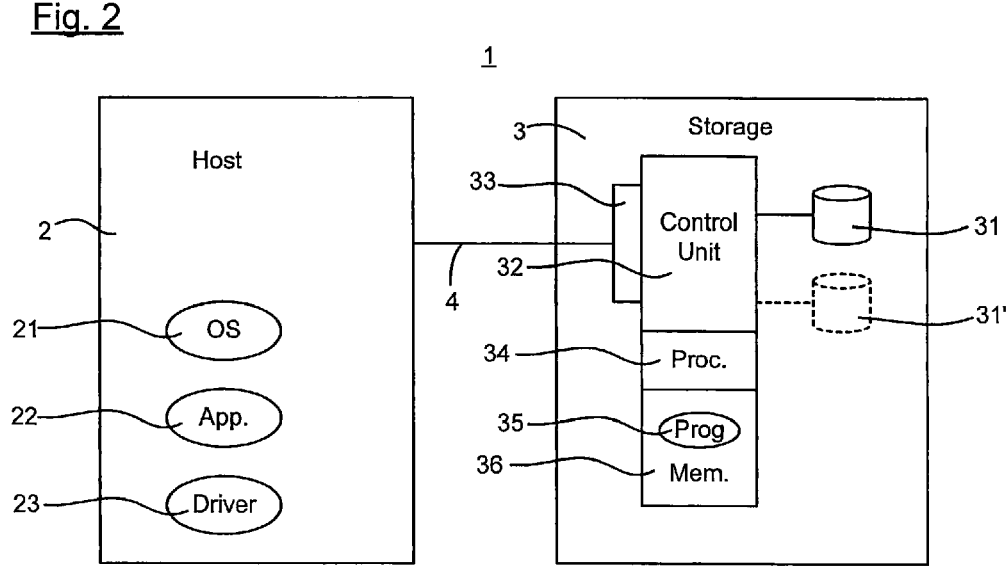
FIG. 2 is a diagram of an alternative form of computer apparatus.

However, the computer system 1 may take a variety of other forms. An alternative implementation is shown in FIG. 2, wherein the computer system 1 is implemented in a single apparatus. In this case, the storage system 3 is a module insertable into that apparatus, typically referred to as "a drive", and the databus 4 is an internal databus of the host system 2, for example a SATA databus or a SCSI databus. Furthermore, the system control unit 32 directly controls the storage of data onto the physical storage media 31. Thus, an independent drive control unit 38 is unnecessary but otherwise the storage system 1 operates in fundamentally the same manner.

The host system 2 uses the storage system 3 to store data. The host system 2 issues data access requests to the storage system 3 over the databus 4 and the storage system 3 stores data in response thereto.

The data structure of the data stored in the physical storage media 31 will now be described with reference to FIG. 3 which illustrates the specific example of a FAT file system, for example FAT32, although any other file system could equally be used, for example the NTFS file system.

The physical storage media 31 has one or more partitions 50. FIG. 3 illustrates two partitions 50, but in general there could be any number of partitions 50. The first sector of the physical storage media 31 stores the master boot record 51 (sometimes referred to as the partition sector). The master boot record 51 contains a partition table containing partition information specifying the division of the space of the physical storage media 31 into the partition 50.

Each partition 50 is logically formatted in accordance with a respective file system. The file systems of each partition 50 may be different.

Figure 3:
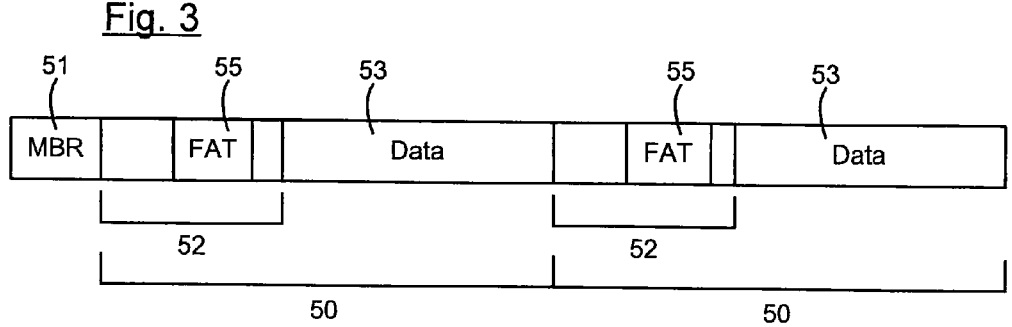
FIG. 3 is a diagram of the data structure of data in the physical storage media.

The file system is specified by file system information 52 typically stored in the first sectors of each partition 50, the remainder of the partition 50 constituting a data region 53 (not drawn to scale in FIG. 3). The file system information 52 specifies basic information about the file system including its type and how the data region 53 is divided into clusters. The file system information 52 specifies the size of clusters, a cluster comprising a plural number of blocks (which are also referred to as sectors) being the smallest unit of data which may be accessed (read or written) in the data region 53. Thus the file system information 52 also effectively specifies how the data region 53 is divided into blocks. The file system information 52 has a structure in accordance with the specification of the file system used.

The file system information 52 includes file allocation information 55 which specifies how individual files of data are allocated to clusters, and hence blocks, within the file system. In the case of a FAT file system, the file allocation information 55 is in the file allocation table which gives the FAT file system its name. Other file systems use alternative data structures. The host system 2 stores data in accordance with the file system and updates the file allocation information 55 when data files are stored, deleted or changed.

In addition, the file system information 52 contains unusable block data which specifies blocks of storage space which are unusable. Typically the unusable block data will refer to sectors consisting of plural blocks and will thus effectively specify that all the blocks of a sector are unusable.

Such unusable block data is defined using data structures defined in the specification of the file system used. In the case of a FAT file system, the unusable block data is stored in the file allocation table which will include special entries to mark a cluster as being unusable. In the case of the NTFS file system, the unusable block data is stored in the $BadClus metadata file, and the blocks concerned are also marked as used in the $BitMap metadata file. Most file systems store data expressly specifying the unusable blocks. In principle a file system could instead expressly specify the usable blocks, but this would still implicitly specify the unusable blocks and so constitute unusable block data for the purposes of the present invention.

The primary purpose of the unusable block data is to mark a block as unusable when there is a technical fault or defect in the physical block of the physical storage media 31 mapped to the logical block. Typically, when a technical problem is encountered in an access to a particular logical block, the system control unit 32 sends a signal to the host system 2 informing the host system 2 that the logical block in question in unusable. In response, the host system 2 updates the unusable block data by sending appropriate access requests back to the storage system 3. However, in accordance with the present invention the unusable block data is used for an additional purpose as described below.

Each block of data in the data region 53 is attributed with a logical block address. Access requests sent from the host system 2 to the storage system 3 over the databus 4 specify the logical block addresses of the logical blocks to be accessed. The system control unit 32 performs data accesses in accordance with the access requests. The system control unit 32 controls the storage of data in the physical storage media 31 in physical blocks. The arrangement of the physical blocks is transparent to the host system 2. Thus, the system control unit 32 employs a mapping which maps the logical block addresses specified in an access request to the physical block addresses of the physical blocks in the physical storage media 31.

The form of this mapping depends on the nature of the physical storage media 31. In the case that the physical storage media 31 is a single storage device, the mapping may be a conventional one-to-one mapping of consecutive logical block addresses to consecutive physical block addresses (subject to the modification described below).

In the case that the physical storage media 31 comprises plural storage devices, the system control unit 32 maps the logical block addresses to the respective devices 31. Such a mapping may involve the entirety of each storage device being mapped to a group of consecutive logical block addresses or may involve consecutive logical block addresses being mapped to physical block addresses striped across the storage devices. The system control unit 32 can implement redundant storage of data on the plural storage devices, for example in accordance with a RAID level. In this case, the original data and redundant data such as parity data is spread across the storage devices. Thus, the system control unit 32 maps each logical block address to a physical block address to one of the storage devices in accordance with the redundancy scheme used.

Figure 4:
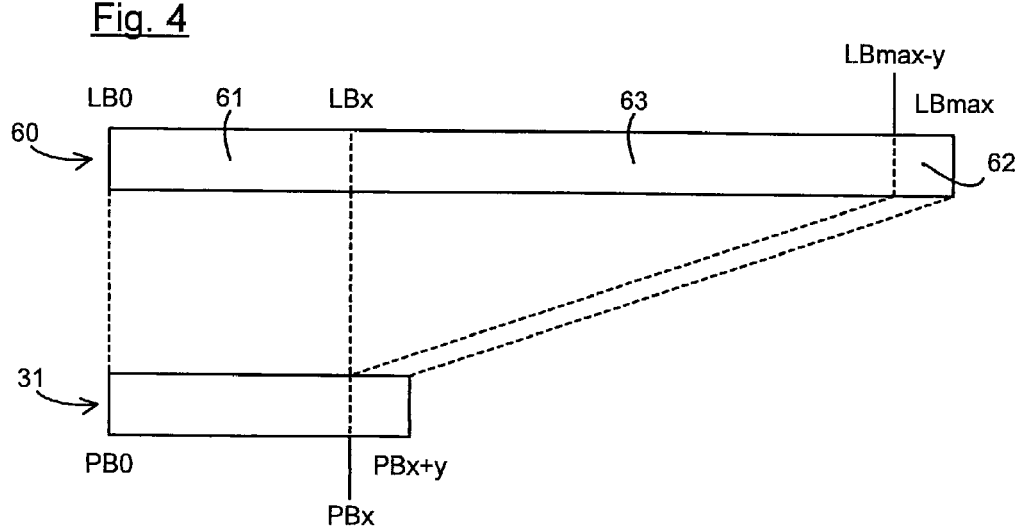
FIG. 4 is a schematic diagram of the mapping employed by the storage system.

In contrast to the normal situation, the system control unit 32 employs a mapping in which some logical blocks, referred to as excess logical blocks, are not mapped to space in the physical storage media 31. An example of this is illustrated in FIG. 4 which shows the mapping between the logical blocks of a single partition 60 (although in general there could be more partitions) and the physical blocks of the physical storage media 31. For ease of illustration, this example relates to the case that the physical storage media 31 is a single storage device and so, generally speaking, there is a one-to-one mapping of consecutive logical block addresses to consecutive physical block addresses.

The logical blocks 61 at the start of the partition 60 at addresses LB0 to LBx are mapped to the consecutive physical blocks PB0 to PBx and the logical blocks 62 at the end of the partition 60 at addresses LBmax−y to LBmax are mapped to physical block addresses PBx to PBx+y. This may be achieved by a consecutive one-to-one mapping in which the logical blocks 62 are subject to an offset of (LBx-LBmax−y). In this example, the mapped logical blocks 62 are separated from the mapped logical blocks 61 to meet the requirement of some file systems of placing information at the beginning and end of the partition 60. Between the mapped logical blocks 61 and the mapped logical blocks 62, there are excess logical blocks 63 which are not mapped to any physical block address in the physical storage media 31. In order to effect the mapping, the system control unit 32 stores a record of the excess logical blocks 63 in the memory 36 and uses the stored records to calculate appropriate offsets for any given logical block address specified in an access request.

Data access requests to the excess logical block 63 should not be made. If the host system was to send an access request specifying the logical block address of one of the excess logical blocks 63, then the system control unit 32 would return the appropriate error code to indicate that the logical block in question is unusable. To prevent the host system 2 from doing this, unusable block data is created in the file system information 52 which specifies that the excess logical blocks 63 are unusable. As a result, it will appear to the host system 2 that the excess logical blocks 63 are not useable space of the partition 60. As a result, the partition 60 provides the same data storage capacity as if no excess logical blocks 63 were provided.

However, there is achieved an advantage that it is convenient to adjust the available data storage capacity of the partition 60. In particular, adjustment may be achieved by changing the mapping employed by the storage system 3 to map more or fewer logical block addresses to space in the physical storage media 31. This has the result of destroying or creating excess logical blocks 63. Accordingly, a corresponding change is also made to the unusable block data change the excess logical blocks 63 marked as unusable.

There will now be described two scenarios in which the available storage capacity is adjusted.

The first scenario has the case that an additional drive unit 37', as shown in dotted outline in FIG. 1, is introduced into the storage system 3. The additional drive unit 37' is identical to the original drive unit and comprises a drive control unit 38' and additional storage media 31', thereby creating new storage space in the storage system 3.

In this scenario, the excess logical blocks 63 are used to accommodate the new storage space of the additional storage media 31' within the existing partition 60 without the need to create a new partition or for the user to modify the existing partition 60 using a tool in the host system.

Initially, the partition 60 is created as shown in FIG. 4 and the file system information specifies that the partition 60 has a plurality of logical blocks having a storage capacity greater than a storage capacity of the pre-existing physical storage media 31. For example, the partition 60 may be specified as having the maximum possible size (typically 2 TB at present but this is not limitative), whereas the physical storage media 31 will have a much smaller storage capacity, say of 250 GB. The mapped logical blocks 61 and 62 have the same storage capacity as the physical storage media 31. Thus the excess logical blocks 63 have a data storage capacity, in this example of 1750 GB but are marked by the unusable block data as being unusable. As a result, on the basis of the file system information 52, it will appear to the host system 2 that only the mapped logical blocks 61 and 62 are available for use and hence the available data storage capacity of the partition 60 is equal to the data storage capacity of the physical storage media 31. When a user examines the available space provided by the storage system 3, the operating system 21 of the host system 2 will report that the total data storage capacity of the partition 60 is 2 TB but that the available (or free) data storage capacity is 250 GB (less any data that is subsequently stored therein). Clearly the total capacity is not accurate, but the amount of available capacity is accurate.

Figure 5:
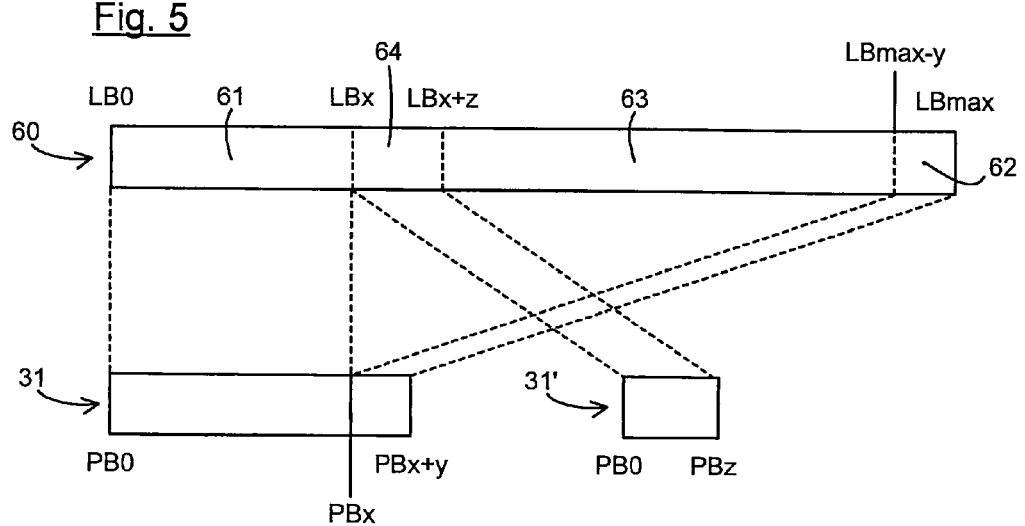
FIG. 5 is a schematic diagram of a change in the mapping in a first scenario.

Subsequently, the additional physical storage media 31' is introduced into the storage system 3. Thereupon, the following process is performed to change the excess logical blocks 63. This is illustrated in FIG. 5.

The system control unit 32 changes the mapping employed to map a group of logical blocks 64 which were previously excess logical blocks 63 to the new space in the additional physical storage media 31'. Excess logical blocks 63 are thus destroyed by the removal of the group of logical blocks 64. The group of logical blocks 64 have the same storage capacity as the additional physical storage media 31', and so the group of logical blocks 64 are at logical block addresses LBx to LBx+z and are mapped to the physical block addresses PB0 to PBz of the additional physical storage media 31'. The change in the mapping is effected by the controller 34 storing a record of the changed excess logical blocks in the memory 36.

In addition, the unusable block data is changed to cease to mark the group of logical blocks 64 as unusable. Action is taken to inform the host system 2 of the change. This may be achieved using various different techniques, as follows.

A first technique is for the system control unit 32 to change the unusable block data stored in the physical storage media 31 as part of the file system information 52. In this case, the host system 2 needs to be informed of the change, because the host system 2 will typically have cached the unusable block data, for example when during start-up it being impractical to check the unusable block data on every data access.

A first option for achieving this without any specific software in the driver 23 of the storage system 3 is to take the storage system 3 temporarily offline. Then when the storage system 3 is returned back online, the host system 2 will read the file system information 52 and thus become aware of the changed unusable block data.

A second option is for the storage system 3 to send a signal to the host system 2 which instructs the host system 2 to re-read the unusable block data. In this case, software on the host system 2, for example as part of the driver 23, interprets the signal and causes the host system 2 to re-read the unusable block information, possibly by re-reading the entire file system information 52.

A second technique is for the system control unit 32 to cause the host system 2 to perform a process which changes the unusable the unusable block data stored in the physical storage media 31 as part of the file system information 52. There are various options for achieving this.

A first option is for the storage system 3 to send a signal to the host system 2 which instructs the host system 2 of the change, specifying the required changes to the unusable block data, including the logical block addresses affected. In this case, software on the host system 2, for example as part of the driver 23, interprets the signal and causes the host system 2 to change the unusable block data of the logical blocks specified in the message by sending appropriate data write requests to the storage system 3. This option requires dedicated software on the host system 2.

A second option is for the storage system 3 to send a signal to the host system 2 which causes the host system 2 to perform a process of verifying the entire partition. Although such a scan may be may be process performed by software stored on the host system 2 which is specific to the storage system 3, advantageously it is possible to make use of a process performed by the operating system 21, where available, for example the CHKDSK process of the Microsoft Vista operating system. In such a process, the host system 2 sends signals to the storage system 3 requesting verification of each logical block. In response the storage system 3 returns signals indicating whether each block is usable or not, in particular by returning an error code for the unusable blocks. In the latter case, where there is a change from the information previously cached by the host system 2, the host system 2 will then change the unusable block data of the logical blocks affected by sending appropriate data write requests to the storage system 3.

The benefit of providing causing the host system 2 to change the unusable block data is to leverage the power of the host system 2 to perform some of the operations faster and/or using standard operating system API calls which could lead to a more robust solution. Also, the host system 2 is self-aware of the changes made to the file system information 52.

As a result of the change to the unusable block data, it appears to the host system 2 that the group of logical blocks 64 have become useable and hence that the available data storage capacity of the partition 60 has been increased by the data storage capacity of the additional storage media 31'. By way of illustration, in the example given above, if the additional physical storage media 31' has a data storage capacity of 200 GB, then it appears to be host system 2 that the available data capacity of the partition 60 has become 1550 GB.

Such a process may be repeated as more additional physical storage media 31' are introduced.

A second scenario in which the available storage capacity can be adjusted is where the user desires to provide a plurality of different partitions, for example in order to present each partition 60 as a different drive to the user (for example C:\, D:\, etc.). In this scenario, the present invention may be used to provide adjustment of the data storage capacity of each different partition, for example depending on the amount of data stored in the partitions.

In this scenario, the plurality of logical blocks specified by the file system information of each partition include excess logical blocks that are not mapped to space in the physical storage media 31 and the data capacity is varied by changing the mappings of the various partitions to vary the excess logical blocks of each one.

Figure 6A:
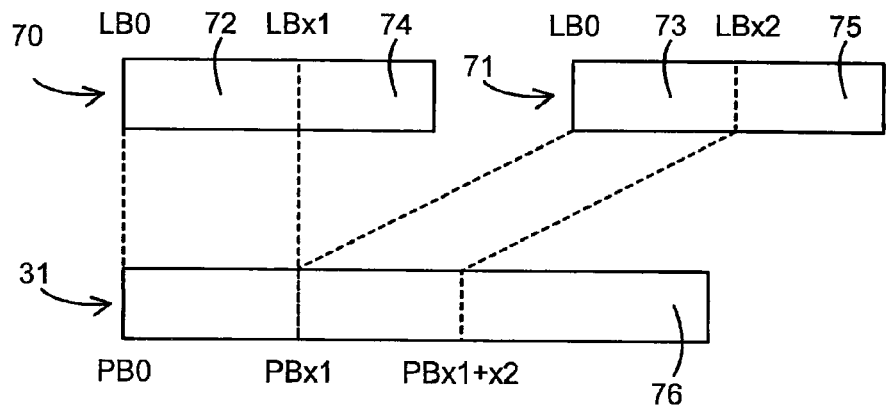
FIGS. 6a, 6b, and 6c are schematic diagrams of changes; in the mapping in a second scenario.

An example of this is shown in FIG. 6A which shows the mapping between the logical blocks of two partitions 70 and 71 and the physical blocks of the physical storage media 31. Although this example relates to the case of two partitions 70 and 71 ease of illustration, in general there may be any number of partitions. This example also relates to the case that a physical storage media 31 is a single storage device and so, in general terms, there is a one-to-one mapping of consecutive logical block addresses to consecutive physical block addresses. For simplicity it is assumed that the final logical blocks of each partition 70 and 71 are not mapped to space in the physical storage media 31 although the mapping could easily be adapted to accommodate this in the manner shown in FIG. 4.

The logical blocks 72 at the beginning of the first partition 70 and the logical blocks 73 at the beginning of the second partition 71 are both mapped to physical block addresses of the physical storage media 31. In particular, the logical blocks 72 at logical block addresses LB0 to LBx1 are mapped to physical block addresses PB0 to PBx1 and the logical blocks 73 at logical block addresses LB0 to LBx2 of the second partition 71 are mapped to physical block addresses PBx1 to PBx1+x2. Thus the first partition contains excess logical blocks 74 and the second partition 71 contains excess logical blocks 75 which are not mapped to physical block addresses in the physical storage media 31. In order to effect the mapping, the system control unit 32 stores a record of the excess logical blocks 74 and 75 in the memory 36 and uses the stored records to calculate appropriate offset at any given logical block address specified in an access request.

Thus, each partition 70 and 71 is allocated a share of the data storage capacity of the physical storage media 31. In this example, there is a free portion 76 of the space in the physical storage media 31 that has no logical blocks of any partition 70 or 71 mapped to it. Thus, the total data storage capacity of the logical blocks 72 and 73 of both partitions 70 and 71 (i.e. all the logical blocks of the partitions 70 and 71 excluding the excess logical blocks 74 and 75) is less than the data storage capacity of the physical storage media 31. However this is not essential.

Data access requests to the excess logical blocks 74 and 75 should not be made. If the host system 2 was to send an access request specifying the logical block address of one of the excess logical blocks 74 and 75, then the system control unit 32 would return the appropriate error code to indicate that the logical block in question is unusable. To prevent the host system 2 from doing this, unusable block data is created in the file system information 52 of each partition 70 and 71 which specifies that the excess logical blocks 63 are unusable. As a result, it will appear to the host system 2 that the excess logical blocks 74 and 75 are not useable space of the partitions 70 and 71.

The storage system control unit 32 is arranged to change the amount of data storage capacity provided to each partition 70 and 71 dynamically, that is subsequent to manufacture of the device, for example during operation or on application of power. The amount of data storage capacity provided to each partition 70 and 71 may be changed on the basis of the amount of data stored in each partition 70 and 71. This allows additional data storage capacity to be provided to a given partition 70 or 71 as it becomes filled. The amount of data storage capacity provided to each partition may be changed on some other basis, for example to allocate space which is more rapidly accessible between the partitions 70 and 71.

There are two techniques for achieving this.

Figure 6B:
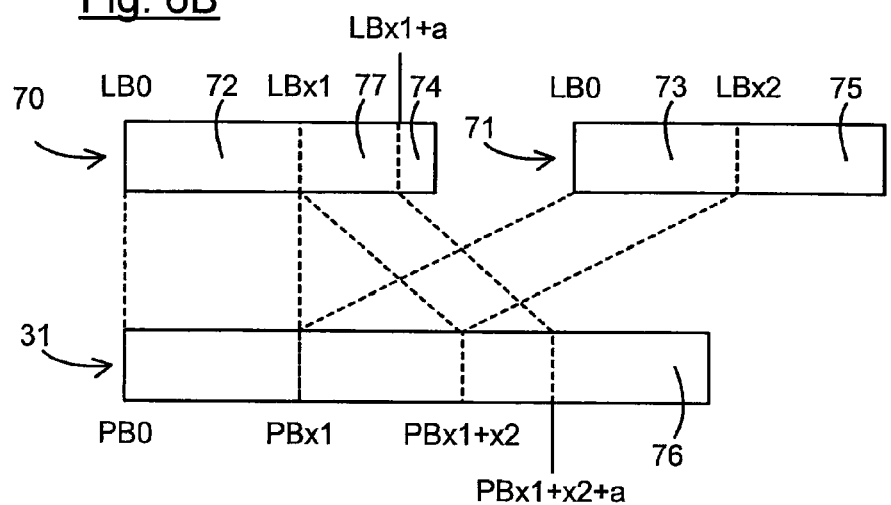

The first technique makes use of the portion 76 of the physical storage media 31 which has no logical block addresses mapped to it (if available). An example of this is illustrated in FIG. 6B for the case that it is desired to allocate additional data storage capacity to the first partition 70.

The system control unit 32 changes the mapping employed to map a group of logical blocks 77 of the first partition 70, which were previously excess logical blocks 74, to space in the free portion 76 of the physical storage media 31. Some of the excess logical blocks 74 of the first partition 70 are thus destroyed by the removal of the group of logical blocks 77. The group of logical blocks 77 are at logical block addresses LBx1 to LBx1+a and are mapped to the physical block addresses PBx1+x2 to PBx1+x2+a of the physical storage media 31. The change in the mapping is effected by the controller 34 storing a record of the changed excess logical blocks 74 in the memory 36.

In addition, the unusable block data is changed to cease to mark the group of logical blocks 77 as unusable. Action is taken to inform the host system 2 of the change. This may be achieved using any of various different techniques described above with respect to the first scenario.

Figure 6C:
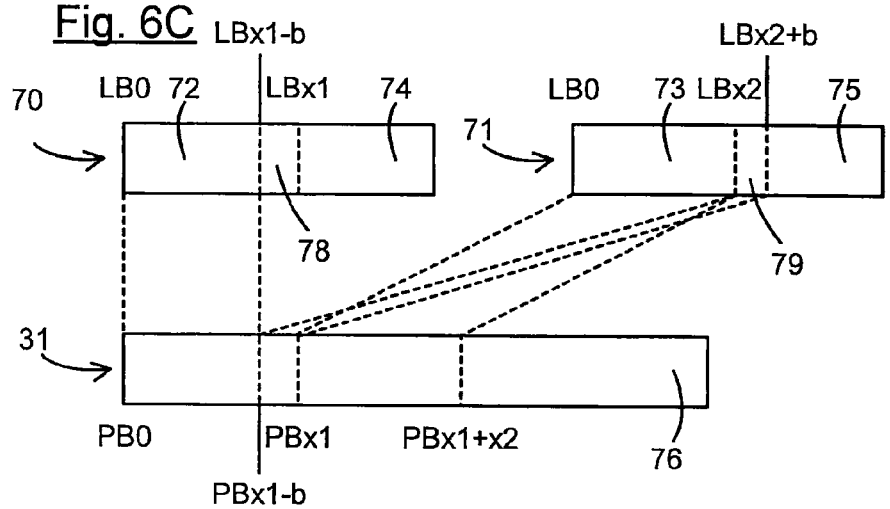

A second technique is to change the allocation of space in the physical storage media 31 between the different partitions 70 and 71. This is illustrated in FIG. 6C for the case that it is desired to allocate space from the first partition 70 to the second partition 71.

The system control unit 32 changes the mapping employed to cease to map a group of logical blocks 78 of the first partition 70, which were previously mapped logical blocks 72, to space in the physical storage media 31. This creates free space. The group of logical blocks 78 are at logical block addresses LBx1−b to LBx1 and so the free space is at physical block addresses PBx1 −b to PBx1. Excess logical blocks 74 are thus created because the group of logical blocks 78 become excess logical blocks 74 of the first partition 70.

The system control unit 32 also changes the mapping employed to map a group of logical blocks 79 of the second partition 71, which were previously excess logical blocks 75, to the free space created in the physical storage media 31. Excess logical blocks 75 of the second partition 71 are thus destroyed by the removal of the group of logical blocks 79. The group of logical blocks 79 are at logical block addresses LBx2 to LBx2+b and are mapped to the physical block addresses PBx1−b to PBx1 of the physical storage media 31.

The change in the mappings is effected by the controller 34 storing a record of the changed excess logical blocks 74 and 75 in the memory 36.

In addition, the unusable block data is changed to cease to mark the group of logical blocks 64 as unusable. Action is taken to inform the host system 2 of the change. This may be achieved using any of various different techniques described above with respect to the first scenario.

Of course the embodiments described above are merely exemplary and various modifications can be made.

For example, whilst in the above description it is assumed that the file system information 52 is stored in the same physical storage media 31 as the data region 53, it is possible for the storage device 3 to store the file system information 52 in a type of physical storage media 31 having a faster access time, for example a flash memory or the memory 36. This is advantageous because the file system information 52 is frequently accessed.

The invention claimed is:

1. A method of providing adjustable data storage capacity to a host system from a storage system having physical storage media for storage of data, wherein the storage system is arranged to store data in at least one partition of the physical storage media in accordance with file system information, stored in the storage system, specifying a plurality of logical blocks having logical block addresses within the partition, the file system information including unusable block data marking logical blocks as unusable, and the storage system is arranged, in response to access requests specifying logical block addresses in the at least one partition, to access the physical storage media employing a mapping which maps logical block addresses to space in the physical storage media, the method comprising storing file system information specifying a plurality of logical blocks including excess logical blocks that are not mapped to space in the physical storage media by the mapping employed by the storage system, and including unusable block data marking said excess logical blocks as unusable, the data storage capacity being adjustable by changing the mapping employed by the storage system to map more or fewer logical block addresses to space in the physical storage media and thereby destroy or create excess logical blocks, and changing the unusable block data to correspondingly change the excess logical blocks marked as unusable.

2. The method according to claim 1, wherein the file system information specifies a plurality of logical blocks having a storage capacity greater than the storage capacity of the physical storage media, and the method further comprises introducing additional physical storage media into the storage system;

changing the mapping employed by the storage system to map the logical block addresses of a group of logical blocks which were previously excess logical blocks to space in the additional physical storage media; and changing the unusable block data to correspondingly cease to mark the group of logical blocks as unusable.

3. The method according to claim 1, wherein the file system information, including the unusable block data, in each partition has a data structure in accordance with a specification of a file system.

4. The method according to claim 1, wherein the storage system changes the unusable block data.

5. The method according to claim 4, wherein the storage system sends a signal to the host system instructing the host system to re-read the file system information.

6. The method according to claim 1, wherein the storage system sends a signal to the host system which causes the host system to perform a process which changes the unusable block data.

7. The method according to claim 6, wherein the signal causes the host system to perform a verification of the physical storage media of the storage system in which the usability of each block of data is notified to the host system.

8. The method according to claim 6, wherein the signal specifies the required changes to the unusable block data.

9. The method according to claim 1, wherein the physical storage media stores partition information specifying the at least one partition.

10. The method according to claim 9, wherein the file system is the FAT file system, the file system information includes a file allocation table and the unusable block data is stored in the file allocation table.

11. The method according to claim 9, wherein the file system is the NTFS file system, the unusable block data is stored in a $BadClus metadata file.

12. The method according to claim 1, wherein
the storage system is arranged to store data in plural partitions of the physical storage media, the file system information of each partition specifying a plurality of logical blocks including excess logical blocks that are not mapped to space in the physical storage media by the mapping employed by the storage system, and
the mapping employed by the storage system is changed to map more or fewer logical block addresses of partitions to space in the physical storage media, and changing the unusable block data to correspondingly change the excess logical blocks marked as unusable.

13. The method according to claim 12, wherein
the plurality of logical blocks specified by the file system information of all the partitions, excluding the excess logical blocks, has a data storage capacity less than the data storage capacity of the physical storage media of the storage system, and
the mapping employed by the storage system is changed to map logical block addresses of a group of logical blocks of a partition which were previously excess logical blocks to space in the physical storage media which was not previously mapped and the unusable block data is changed to correspondingly cease to mark the group of logical blocks of that partition as unusable.

14. The method according to claim 12, wherein
the mapping employed by the storage system is changed to cease to map logical block addresses of a group of logical blocks of a first partition to space in the physical storage media and the unusable block data is changed to correspondingly mark the group of logical blocks of the first partition as unusable, and
the mapping employed by the storage system is further changed to map logical block addresses of a group of logical blocks of a second partition which were previously excess logical blocks to the space in the physical storage media to which the group of logical blocks of the first partition was previously mapped and the unusable block data is changed to correspondingly cease to mark the group of logical blocks of the second partition as unusable.

15. The method according to claim 12, wherein the mapping employed by the storage system is dynamically changed to map more or fewer logical block addresses of partitions to space in the physical storage media on the basis of the amount of data stored in the partitions.

16. A storage system comprising physical storage media for storage of data capable of providing adjustable data storage capacity to a host system, wherein
the storage system is arranged to store data in at least one partition of the physical storage media in accordance with file system information, stored in the storage system, specifying a plurality of logical blocks having logical block addresses within the partition, the file system information including unusable block data marking logical blocks as unusable,
the storage system is arranged, in response to access requests specifying logical block addresses in the at least one partition, to access the physical storage media employing a mapping which maps logical block addresses to space in the physical storage media, and
the file system information specifies a plurality of logical blocks including excess logical blocks that are not mapped to space in the physical storage media by the mapping employed by the storage system, and includes unusable block data marking said excess logical blocks as unusable, the storage system being arranged to adjust the data storage capacity by changing the mapping to map more or fewer logical block addresses to space in the physical storage media and thereby destroy or create excess logical blocks, and by causing the unusable block data to be changed to correspondingly change the excess logical blocks marked as unusable.

17. The storage system according to claim 16, wherein
the file system information specifies a plurality of logical blocks having a storage capacity greater than the storage capacity of the physical storage media, and
the storage system is arranged, on introduction of additional physical storage media into the storage system, to change the mapping employed by the storage system to map the logical block addresses of a group of logical blocks which were previously excess logical blocks to space in the additional physical storage media; and to change the unusable block data to correspondingly cease to mark the group of logical blocks as unusable.

18. The storage system according to claim 16, wherein the physical storage media stores partition information specifying the at least one partition.

19. The storage system according to claim 16, wherein the storage system is arranged to change the unusable block data.

20. The method according to claim 19, wherein the storage system is arranged to send a signal to the host system instructing the host system to re-read the file system information.

21. The storage system according to claim 16, wherein the storage system is arranged to send a signal to the host system which is capable of causing the host system to perform a process which changes the unusable block data.

22. The storage system according to claim 21, wherein the signal is capable of causing the host system to perform a verification of the physical storage media of the storage system in which the usability of each block of data is notified to the host system.

23. The storage system according to claim 21, wherein the signal specifies the required changes to the unusable block data.

24. The storage system according to claim 16, wherein the file system information, including the unusable block data, in each partition has a data structure in accordance with a specification of a file system.

25. The storage system according to claim 24, wherein the file system is the FAT file system, the file system information includes a file allocation table and the unusable block data is stored in the file allocation table.

26. The storage system according to claim 24, wherein the file system is the NTFS file system, the unusable block data is stored in a $BadClus metadata file.

27. The storage system according to claim 16, wherein
the storage system is arranged to store data in plural partitions of the physical storage media, the file system information of each partition specifying a plurality of logical blocks including excess logical blocks that are not mapped to space in the physical storage media by the mapping employed by the storage system, and the storage system is arranged to change the mapping employed to map more or fewer logical block addresses of partitions to space in the physical storage media, and to change the unusable block data to correspondingly change the excess logical blocks marked as unusable.

28. The storage system according to claim 27, wherein the plurality of logical blocks specified by the file system information of all the partitions, excluding the excess logical blocks, has a data storage capacity less than the data storage capacity of the physical storage media of the storage system, and the storage system is arranged to change the mapping to map logical block addresses of a group of logical blocks of a partition which were previously excess logical blocks to space in the physical storage media which was not previously mapped and the unusable block data is changed to correspondingly cease to mark the group of logical blocks of that partition as unusable.

29. The storage system according to claim 27, wherein the storage system is arranged to change the mapping to cease to map logical block addresses of a group of logical blocks of a first partition to space in the physical storage media and to change the unusable block data to correspondingly mark the group of logical blocks of the first partition as unusable, and the storage system is arranged further to change the mapping to map logical block addresses of a group of logical blocks of a second partition which were previously excess logical blocks to the space in the physical storage media to which the group of logical blocks of the first partition was previously mapped and to change the unusable block data to correspondingly cease to mark the group of logical blocks of the second partition as unusable.

30. The storage system according to claim 27, wherein the storage system is arranged to dynamically change the mapping employed to map more or fewer logical block addresses of partitions to space in the physical storage media on the basis of the amount of data stored in the partitions.

* * * * *